United States Patent Office 3,773,783
Patented Nov. 20, 1973

3,773,783
BENZYL SUBSTITUTED-5-ARYL-IMIDAZO [2,1-a]ISOINDOLES
William J. Houlihan, Mountain Lakes, N.J., assignor to Sandoz-Wander, Inc., Hanover, N.J.
No Drawing. Filed July 24, 1972, Ser. No. 274,311
Int. Cl. C07d 57/02
U.S. Cl. 260—309
4 Claims

ABSTRACT OF THE DISCLOSURE

Benzyl substituted-5-aryl-imidazo[2,1-a]isoindoles, e.g., 5-benzyl - 5 - (p-chlorophenyl)-5H-imidazo[2,1-a]isoindoles are prepared by treating alkali metal salts of 5-aryl-imidazo[2,1-a]isoindoles with benzyl halides and are useful as anti-microbials.

---

This invention relates to imidazo[2,1-a]isoindole derivatives which exhibit anti-microbial activty. In particular, it relates to benzyl substituted-5-aryl-imidazo[2,1-a] isoindoles, their preparation and intermediates used in their preparation.

The compounds of this invention may be represented by the formula

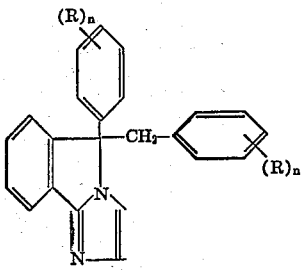

(I)

where
each R independently represents halo having an atomic weight of about 19 to 36, straight chain lower alkyl, i.e., straight chain alkyl having 1 to 4 carbon atoms, e.g., methyl, ethyl, isopropyl and the like, straight chain lower alkoxy, i.e., straight chain alkoxy having 1 to 4 carbon atoms, e.g., methoxy, ethoxy, isopropoxy and the like or trifluoromethyl and
each n independently represents 0, 1 or 2
provided two trifluoromethyl groups are not bonded to adjacent carbon atoms; and pharmaceutically acceptable acid addition salts thereof.

The compounds of Formula I are prepared according to the following reaction scheme:

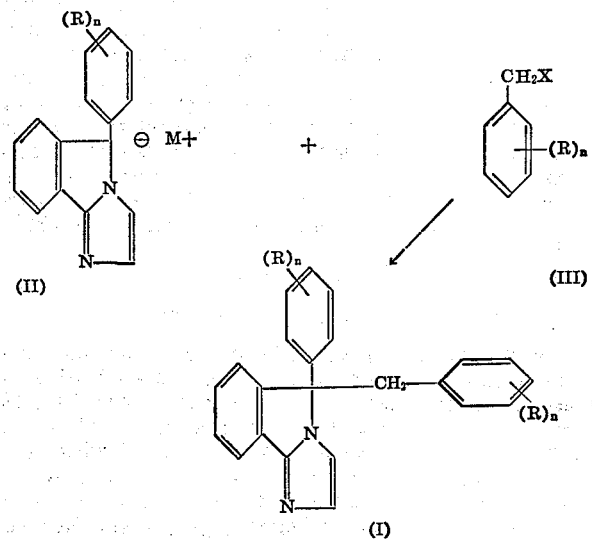

where
X is halo having an atomic weight of about 35 to 80
M represents an alkali metal cation and
R, n and the proviso are as stated above.

The compounds of Formula I are prepared by treating compounds of Formula II with a benzyl halide of Formula III. The reaction is carried out under an inert atmosphere such as argon, neon, nitrogen and the like, preferably nitrogen. The compounds of Formula IIII in which X is bromine are preferred in the process. Although a solvent is not required, the reaction is preferably carried out in the presence of an inert solvent, e.g., aromatic hydrocarbons such as benzene, toluene and the like or the dilower alkyl substituted amides such as dimethylacetamide or dimethylformamide. The temperature of the reaction is not critical, but it is preferred that the process be carried out at a temperature between about 0° to 50° C., especially 20° to 30° C. For optimum results the reaction is run for about 12 to 25 hours, preferably 17 to 20 hours. The reaction time is not critical. The product is recovered by conventional techniques e.g., evaporation or recrystallization.

The compounds of Formula II are prepared according to the following reaction scheme:

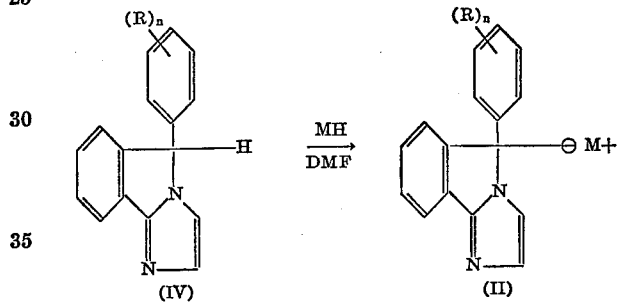

where
M represents an alkali metal cation and
R, n and the proviso are as stated above.

The compounds of Formula II are prepared by treating compounds of Formula IV with an alkali metal hydride such as potassium hydride, lithium hydride, preferably sodium hydride in an inert solvent. The reaction is carried out in an inert atmosphere such as argon, neon, nitrogen and the like preferably nitrogen. The preferred solvents are the aromatic hydrocarbons such as benzene, toluene and the like or the dilower alkyl substituted amides such as dimethylacetamide, dimethylformamide and the like. The temperature of the reaction is not critical, but it is preferred that the process be carried out at temperatures between about 20° to 100° C., especially 45° to 55° C. For optimum results, the reaction is run for about 1 to 3 hours; preferably 1½ to 2½ hours. The particular solvent used and the reaction time are not critical. The compounds of Formula II normally are not isolated but are used in the next step in the solvent in which they are prepared.

Many of the compounds III and IV are known and may be prepared according to methods disclosed in the literature. Those compounds of Formula III and IV which are not specifically disclosed in the literature are prepared by analogous methods using known starting materials.

The compounds represented by Formula I above are useful as anti-microbial agents as indicated by (1) their inhibiting effect on bacteria, in vitro by the agar plate test, and (2) by their activity in vitro against streptococci organisms as indicated by conventional serial dilution test. Both effects are ascertained at a concentration of 10.0 to 50 micrograms/ml. against organisms such as Strepto-

*coccus aronson, Streptococcus lactis, Streptococcus pyogenes* and the like.

For such use, the compounds I may be combined with a pharmaceutically acceptable carrier or adjuvant, and may be administered orally in such form as tablets, elixers, suspensions and the like, or parenterally in the form of an injectable solution or suspension. The dosage will vary depending upon the mode of administration utilized and the particular compound employed.

The compounds of Formula I may be similarly administered in the form of their non-toxic pharmaceutically acceptable acid addition salts. Such salts possess the same order of activity as the free base, and are readily prepared by reacting the base with an appropriate acid and accordingly are included within the scope of this invention. Representative of such salts are the mineral acid salts, such as the hydrochloride, sulfate and the like and the organic acid salts, such as the acetate, p-toluenesulfonate, maleate and the like.

In general, satisfactory results are obtained when these compounds are orally administered for systemic use at a daily dosage of about 10 mg. to about 100 mg. per kilogram of mineral body weight. The daily dosage is preferably administered 2 to 4 times a day, or in sustained release form. For most large mammals in need of said treatment, the total daily dosage is from about 0.5 gm. to about 7 grams. Dosage forms suitable for internal use comprise about 0.125 gm. to about 3.5 grams of active compound in intimate admixture with a solid or liquid pharmaceutically acceptable carrier or diluent.

A representative formulation suitable for oral administration 2 to 4 times a day for the treatment of bacterial infections is a capsule prepared by standard encapsulating techniques which contains the following:

Ingredients: Weight (mg.)
5-benzyl-5-(p-chlorophenyl) - 5H - imidazo[2,1-a]isoindole _____ 100
Inert solid diluent (starch, lactose, kaolin) ___ 200

EXAMPLE 1

5-benzyl-5-(p-chlorophenyl-5H-imidazo[2,1-a]isoindole

To a flask equipped with a stirrer, dropping funnel, condenser and gas inlet tube maintained under a nitrogen atmosphere, there is added 13.3 g. (0.05 mole) of 5-p-chlorophenyl-5H-imidazo[2,1 - a]isoindole in 150 ml. in dry dimethylformamide. Stirring is initiated and 2.3 g. of sodium hydride (0.055 mole, 57% in mineral oil) is added at a temperature of 50° C. The reaction mixture is stirred for two hours and then cooled to 20° C. at which time 10.3 g. (0.06 mole) of benzyl bromide in 50 ml. of dimethylformamide is added dropwise maintaining the temperature at about 20° C. The mixture is stirred at room temperature for 18 hours and the excess dimethylformamide is removed in vacuo. The residue is dissolved in methylene chloride and washed with water. After separated, the methylene chloride phase is dried over sodium sulfate, filtered and evaporated in vacuo. The residue is crystallized from isopropanol to give 5-benzyl-5-(p-chlorophenyl)-5H-imidazo[2,1-a]isoindole, M.P. 218–221° C.

Following the above procedure, and using in place of 5-p-chlorophenyl-5H-imidazo[2,1-a]isoindole an equivalent amount of (a) 5-p-tolyl-5H-imidazo[2,1-a]isoindole,
(b) 5-p-methoxyphenyl-5H-imidazo[2,1-a]isoindole,
(c) 5-m-trifluoromethylphenyl-5H-imidazo[2,1-a]isoindole, or
(d) 5-phenyl-5H-imidazo[2,1-a]isoindole there is obtained (a) 5-benzyl-5-(p-tolyl)-5H-imidazo[2,1-a]isoindole,
(b) 5-benzyl-5-(p-methoxyphenyl)-5H-imidazo[2,1-a]isoindole,
(c) 5-benzyl-5-(m-trifluoromethylphenyl)-5H-imidazo-[2,1-a]isoindole, or
(d) 5-benzyl-5-(phenyl)-5H-imidazo[2,1-a]isoindole respectively.

5-benzyl-5-(p-chlorophenyl) - 5H - imidazo[2,1-a]isoindole of this example is an effective anti-microbial agent when orally administered to an animal suffering from bacterial infections at a dosage of 100 milligrams four times per day.

EXAMPLE 2

Following the procedure of Example 1 and using in place of benzylbromide an equivalent amount of (a) p-methylbenzylbromide,
(b) p-methoxybenzylchloride,
(c) m-trifluoromethylbenzylbromide, or
(d) p-chlorobenzylbromide, there is obtained (a) 5-(p-mehylbenzyl)-5-(p-chlorophenyl)-5H-imidazo[2,1-a]isoindole,
(b) 5-(p-methoxybenzyl)-5-(p-chlorophenyl)-5H-imidazo[2,1-a]isoindole,
(c) 5-(m-trifluoromethylbenzyl)-5-(p-chlorophenyl)-5H-imidazo[2,1-a]isoindole, or
(d) 5-(p-chlorobenzyl)-5-(p-chlorophenyl)-5H-imidazo[2,1-a]isoindole, respectively.

What is claimed is:

1. A compound of the formula

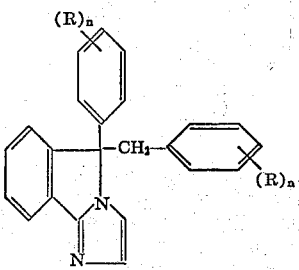

where
each R independently represents halo having an atomic weight of about 19 to 36, straight chain lower alkyl, straight chain lower alkoxy or trifluoromethyl and
each *n* independently represents 0, 1 or 2
provided two trifluoromethyl groups are not bonded to adjacent carbon atoms.

2. A pharmaceutically acceptable acid addition salt of a compound of claim 1.

3. The compound of claim 1 which is 5-benzyl-5-(p-chlorophenyl)-5H-imidazo[2,1-a]isoindole.

4. A process for preparing a compound of claim 1 which comprises treating a compound of the formula

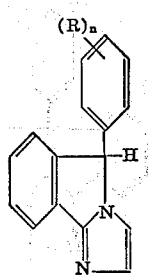

with an alkali metal hydride in an inert solvent and an inert atmosphere to form a salt of the formula

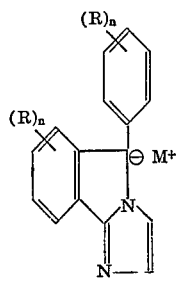

and thereafter treating said salt with a benzyl halide of the formula

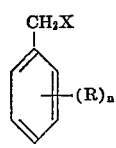

in an inert atmoshpere where
X is halo having an atomic weight of about 35 to 80
M is an alkali metal cation and
R, $n$ and the proviso are as set out in claim 1.

References Cited
UNITED STATES PATENTS

| | | | |
|---|---|---|---|
| 3,526,636 | 9/1970 | Houlihan | 260—309 |
| 3,557,138 | 1/1971 | Sarett et al. | 260—309 |
| 3,715,366 | 2/1973 | Houlihan | 260—309 |

FOREIGN PATENTS

| | | | |
|---|---|---|---|
| 712,784 | 7/1968 | Belgium | 260—309.6 |

NATALIE TROUSOF, Primary Examiner

U.S. Cl. X.R.

424—273